US012735183B2

(12) United States Patent
Perchlik

(10) Patent No.: US 12,735,183 B2
(45) Date of Patent: Sep. 15, 2026

(54) POWER MANAGEMENT OF AIRCRAFT SEAT POWER USING A SMART POWER DISTRIBUTION CONNECTOR

(71) Applicant: Astronics Advanced Electronic Systems Corp., Kirkland, WA (US)

(72) Inventor: David Perchlik, Redmond, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 17/715,823

(22) Filed: Apr. 7, 2022

(65) Prior Publication Data

US 2022/0324577 A1 Oct. 13, 2022

Related U.S. Application Data

(60) Provisional application No. 63/171,685, filed on Apr. 7, 2021.

(51) Int. Cl.

*B64D 11/06* (2006.01)
*H02J 3/008* (2026.01)
*H02J 105/30* (2026.01)
*H02J 105/55* (2026.01)

(52) U.S. Cl.

CPC .......... *B64D 11/0624* (2014.12); *H02J 3/008* (2013.01); *B64D 2221/00* (2013.01); *H02J 2105/32* (2026.01); *H02J 2105/55* (2026.01)

(58) Field of Classification Search

CPC ............ B64D 11/0624; B64D 2221/00; B64D 11/0015; B64D 11/0627; H02J 3/008; H02J 2310/44; H02J 2310/64

See application file for complete search history.

(56) References Cited

U.S. PATENT DOCUMENTS 9,914,548 B1 * 3/2018 Vadillo .................... H02J 1/14
2014/0117753 A1 5/2014 Pradier et al.
2014/0325245 A1 * 10/2014 Santini .................... G06F 1/266 713/300
2015/0123464 A1 * 5/2015 Hess ...................... B64D 11/06 307/9.1
2016/0329724 A1 * 11/2016 Ibrahim .................... H02J 7/50
2021/0097017 A1 4/2021 Santini et al.

OTHER PUBLICATIONS

EP Extended Search Report for corresponding Application No. EP22785483.3, dated May 20, 2025.

* cited by examiner

*Primary Examiner* — Regis J Betsch
*Assistant Examiner* — Alex W Lam
(74) *Attorney, Agent, or Firm* — Wiggin and Dana LLP

(57) ABSTRACT

In an aircraft seat power system, a Smart Power Distribution Connector (PDC) connects a power supply to multiple power outlets. Power to each outlet is monitored and controlled directly by the PDC that is in turn monitored and controlled by the power source. The power source and the PDC share a communication bus through which instructions and responses are communicated. The PDC has the ability to communicate with the outlets by sending instructions and monitoring and acting on the responses from the outlets. The system allows for power management from a supply of limited power. The PDC can provide current limiting, allowing the use of lighter weight and smaller wire and other components.

10 Claims, 7 Drawing Sheets

FIG. 5 Legend:

| AC generator 1 | GEN 1 |
|---|---|
| AC generator 2 | GEN 2 |
| AC transfer bus 1 | X FER BUS 1 |
| AC transfer bus 2 | X FER BUS 2 |
| Transformer rectifier No. 1 | TR No. 1 |
| Transformer rectifier No. 2 | TR No. 2 |
| Transformer rectifier No. 3 | TR No. 3 |
| DC power bus 1 | DC BUS 1 |
| DC power bus 2 | DC BUS 2 |

POWER MANAGEMENT OF AIRCRAFT SEAT POWER USING A SMART POWER DISTRIBUTION CONNECTOR

CROSS-REFERENCE TO RELATED APPLICATION

This application claims priority to U.S. Provisional Application No. 63/171,685 filed Apr. 7, 2021, which is herein incorporated by reference in its entirety.

FIELD OF THE DISCLOSURE

This disclosure relates to a system and method for using a smart power distribution connection to manage power delivered to an outlet or other load located at an aircraft seat.

BACKGROUND OF THE DISCLOSURE

The subject matter of this disclosure generally relates to aircraft passenger seat power systems, and more particularly relates to power supply systems where the desired total combined power output may exceed the power capability of either the aircraft DC power bus, such as a 28V aircraft cabin DC power bus, or the power converter, such as an In Seat Power Supply (ISPS), a DC Power Supply (DCPS), or a DC power converter. that supplies power to the aforementioned 28 VDC bus, or where a lower power draw would enable the use of lighter weight, smaller gauge wire or smaller system components. Such power supply systems typically supply DC power to outlets or other loads located at passenger seats, but embodiments are contemplated that also supply AC power. The subject matter disclosed herein is different from prior solutions in that it details power management using a smart Power Distribution Connector (PDC) with digital communication capabilities.

Currently, in a passenger aircraft, a DCPS typically must support the full rated power to a number of outlets, despite limited information about the types of loads that are connected to those outlets. The present invention makes it possible for a DCPS and PDC to control power being supplied to individual outlets. This allows for a system in which the sum of the total rated power of all attached outlets can be greater than the rated power of the DCPS. It also provides the ability to gather and report status and fault information from the outlets.

Certain challenges are presented by the need to satisfy disparate power requirements of various loads within a power-limited environment. These challenges can be especially acute in an environment such as an aircraft where it is also desirable to minimize the size, weight, and cost of power supply equipment.

The power requirements of commercial passenger aircraft cabins vary depending on passenger behavior. For instance, a business traveler charging and using her or his laptop and charging an external battery backup may consume 100 watts of power, whereas a vacation traveler watching a movie on the InFlight Entertainment (IFE) system and charging a smart phone would use only a few watts of power. A problem arises in conventional systems when the system power bus has insufficient capacity to simultaneously supply operating power to all seat group loads, especially when assuming that each seat's outlet may be consuming the maximum amount of power available to an outlet.

In previous designs not of this invention, the outlet power could be controlled by renegotiation of the USB type-C outlets (such as U.S. Pat. No. 9,914,548, titled "USB Power Management and Load Distribution System" by Pablo Vadillo, the contents of which are incorporated by reference herein in their entirety), or by assigning a priority value to each DC load, indicating its importance relative to other loads (such as U.S. Pat. Pub. No. 2016/0072293, titled "Multi-Mode Power Converter Power Supply System" by Jeffrey Jouper, the contents of which are incorporated by reference herein in their entirety), or outlet power could be under on/off control in a "first in last out" priority where power management may be controlled by the in-seat power supply.

In an embodiment, the present invention is an improvement to such prior designs as it employs a PDC to enable power sharing among subsystems (such as reading lights, ventilation outlets, an IFE system, and call attendant buttons and lights) and can result in a smaller, lighter weight, and lower-cost power system. Unlike U.S. Pat. No. 9,914,548 and U.S. Pat. Pub. No. 2016/0072293, however, in an embodiment of the present invention the power management circuit is part of the PDC and is not required to be coupled to a programable power supply and the PDC can decrease the power provided to each outlet, light, IFE, or other equipment to which it is attached to a zero value. Another advantage of an embodiment of this invention is that the PDC can be connected to a DC power bus or a power source with no communication between the PDC and the power source. The PDC itself, with its integrated power management circuit, is capable of managing the delivery of power to a large number of outlets and other loads without the need to connect each outlet or load to a separate, remote power management circuit. This allows for the PDC to be placed in closer proximity to the outlets, thereby reducing the total cable weight. A power system with a PDC also has advantages over a power system that lacks power management. Prior to type-C USB outlets which featured higher power ratings than their predecessors, most power delivery systems only employed centralized power control that would shut off the DC power bus for the entire cabin if power demands became too great. Such operation is typically referred to as "overload protection" rather than "power management". The disadvantage of centralized power control is that it requires the system to be sized to provide maximum power for all attached devices, and if not, to risk power being shut off to the entire cabin. Accordingly, such centralized power control systems are disfavored for use on commercial airplanes that provide outlets and entertainment systems for passenger use, but may occasionally be found on certain low-cost airlines that only provide power to seats and overhead lights. A smart PDC system, however, affords an airline the ability to add outlets to the passenger seats without having to increase the size of the aircraft's main generator or the aircraft DC power bus.

The use of a PDC to assist in power management allows for the implementation of an "ultralite" type system where one larger power converter powers a greater number of outlets. This has the advantage of reducing size, weight, and cost, all of which are critical features in a commercial passenger aircraft.

The subject matter of the present disclosure is directed to reducing the total rated power delivered by the system without significantly compromising the passenger experience, while reducing the cost and size of the power distribution components and wiring.

BRIEF SUMMARY OF THE DISCLOSURE

In order to overcome and mitigate the deficiencies noted above with conventional approaches to power management for aircraft seat power, this disclosure describes a system and method of managing and distributing power from a supply of limited of power. A plurality of USB outlets and other DC loads are connected to a plurality of power units via interconnecting devices (PDCs). This disclosure outlines the design of the power supply system for sharing total available power and monitoring system status and health, the function of the Smart PDC and the method for managing power using a communication protocol.

An exemplary embodiment of the present invention includes a plurality of outlets and a PDC. Other embodiments may also include a PDC connected to an aircraft system power bus. The system may also include other low-power DC loads such as seat actuation, lighting, IFE, and other devices found in a seat group. As used herein, a low-power DC load is one that draws 100 W of power or less. Such an embodiment would be useful when, for example, the system power bus has insufficient capacity to simultaneously supply operating power to all seat group loads or has sufficient capacity but a reduction in required wire gauge is desirable and achievable using localized current limiting and control.

In environments with multiple loads of varying power requirements, the disclosed system and method allow for effective power management without the need for each component to have an individual power supply capable of supplying its full active-state requirements. Thus, the system's overall weight, size, and complexity may be reduced.

BRIEF DESCRIPTION OF DRAWINGS

The features and advantages of this disclosure will be more fully understood with reference to the following, more detailed description, when taken in conjunction with the accompanying figures.

Like reference numbers and designations in the various drawings indicate like elements.

DETAILED DESCRIPTION

Reference will now be made in detail to describe the exemplary embodiments of this disclosure, which are illustrated in the accompanying drawing. Specific details disclosed herein are not to be interpreted as limiting, but rather as a basis for the claims and teaching one skilled in the art how the present invention could be employed in any appropriately detailed system, structure, or manner. The same reference numbers will be used throughout the drawings to refer to the same or like components, circuits, or functions.

Disclosed is a power supply system capable of sharing or interrupting power and monitoring system status.

Figure 1:
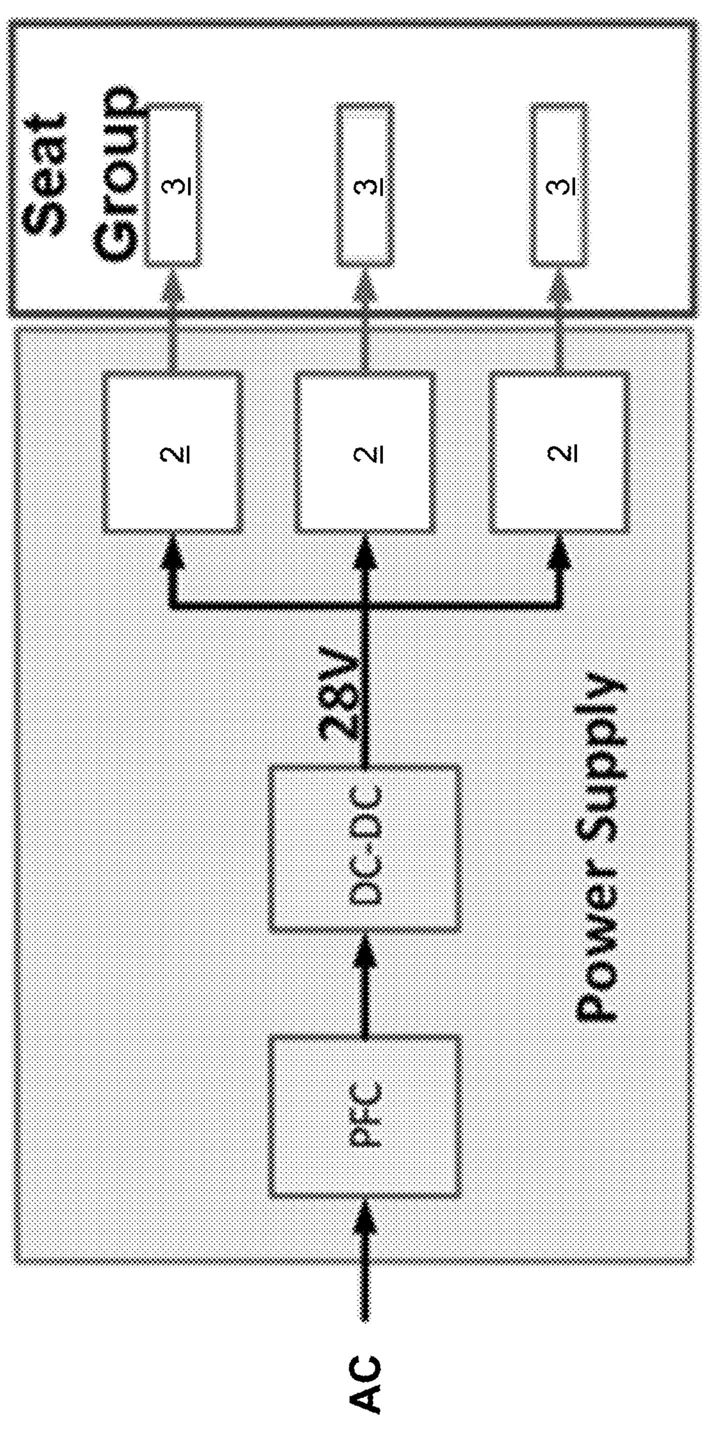
FIG. 1 is a block diagram of a conventional embodiment of an aircraft cabin seat power supply system.

FIG. 1 is a block diagram of a conventional aircraft power supply for passenger seats. As can be seen in this conventional implementation, the power supply is only designed to power a single seat group, with each current limiter circuit 2 connected to a single outlet unit (OU) 3.

Figure 2:
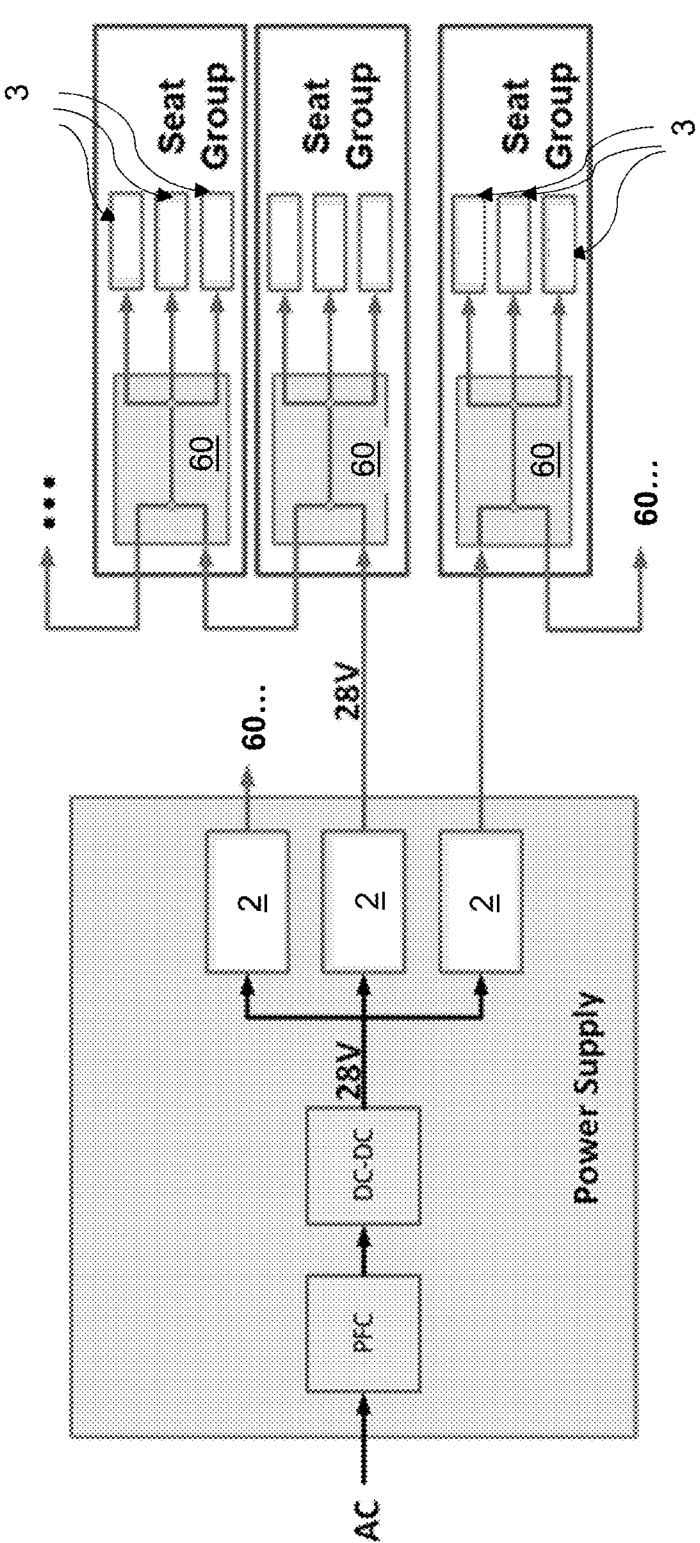
FIG. 2 is a block diagram of an embodiment of an aircraft cabin seat power supply system in accordance with the disclosure.

FIG. 2 is a block diagram that illustrates the PDC system concept of zonal power whereby a single power supply is used to power multiple seat groups within a zone. In this embodiment, each current limited 28V output from the power supply can provide power to one or more PDCs 60, with each PDC 60 distributing power to up to three outlet units (OU) 3 within a seat group. The specific embodiment illustrated in FIG. 2 shows a current limited output from a current limiter circuit 2 connected to at least one PDC 60 and another current limited output from another current limiter circuit 2 connected to at least two PDCs 60.

As an illustrative example, consider the case of a power supply capable of supplying 150 W connected to one or more PDCs 60 that are in turn connected to 100 outlets, with each outlet being rated at 15 W. If ten outlets are each drawing the maximum rated power of 15 W, the one or more PDCs may disable the unused other 90 outlets so that the system does not exceed the 150 W limit. Or in the case where 30 outlets are each drawing 5 W, the one or more PDCs may disable the unused other 70 outlets. In one embodiment of a real-world application with a 150 W power supply limit, two PDCs 60 may be connected to three to four outlets each to ensure that every passenger is able to receive at least some power from an outlet at their seat.

Figure 3:
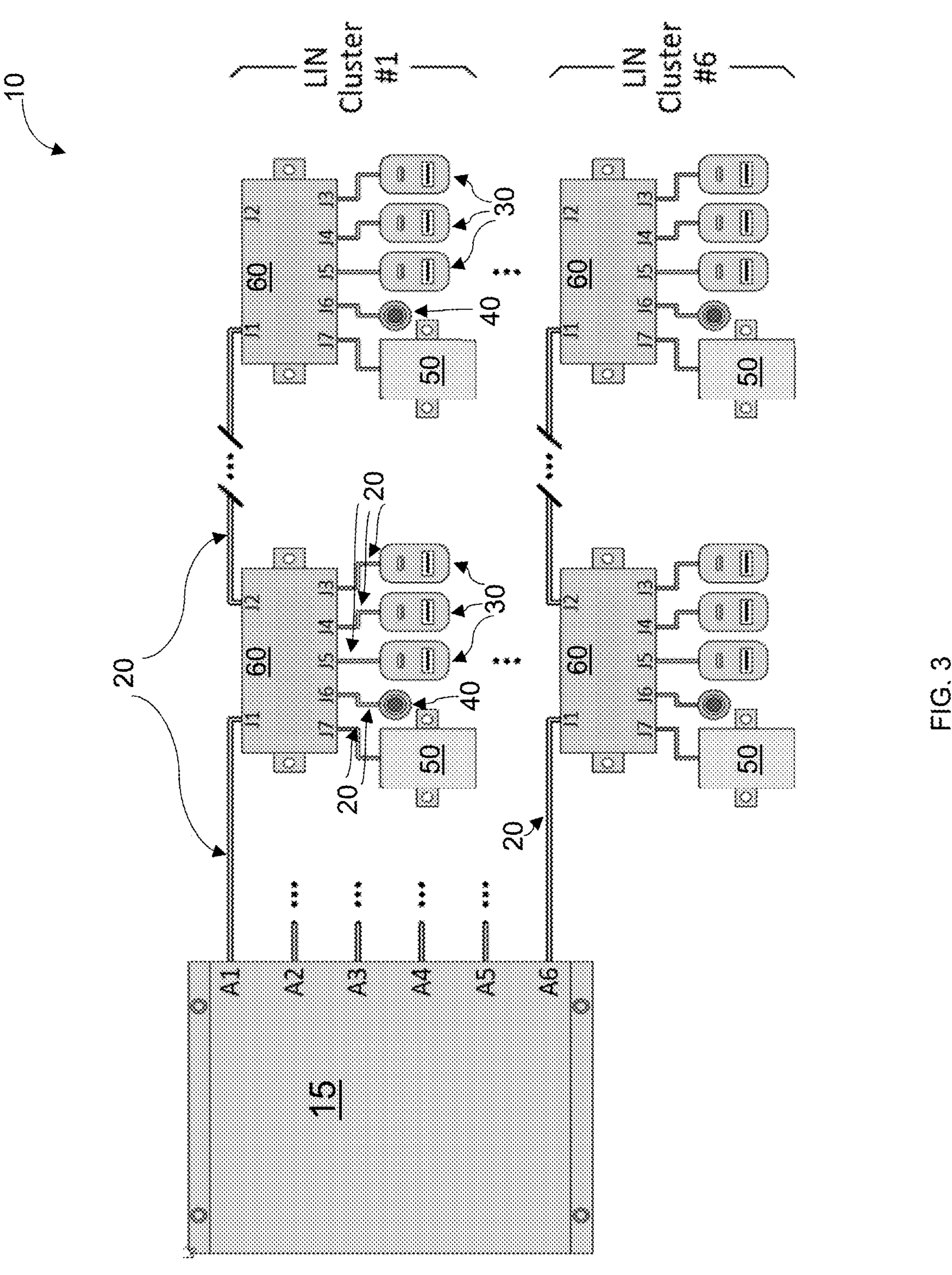
FIG. 3 is a partial schematic diagram illustrating PDCs in the embodiment of FIG. 2.

FIG. 3 is a schematic diagram of an embodiment of an aircraft power supply system 10. This embodiment illustrates a typical configuration of multiple seat groups, with sets of three seats per group.

Figure 4:
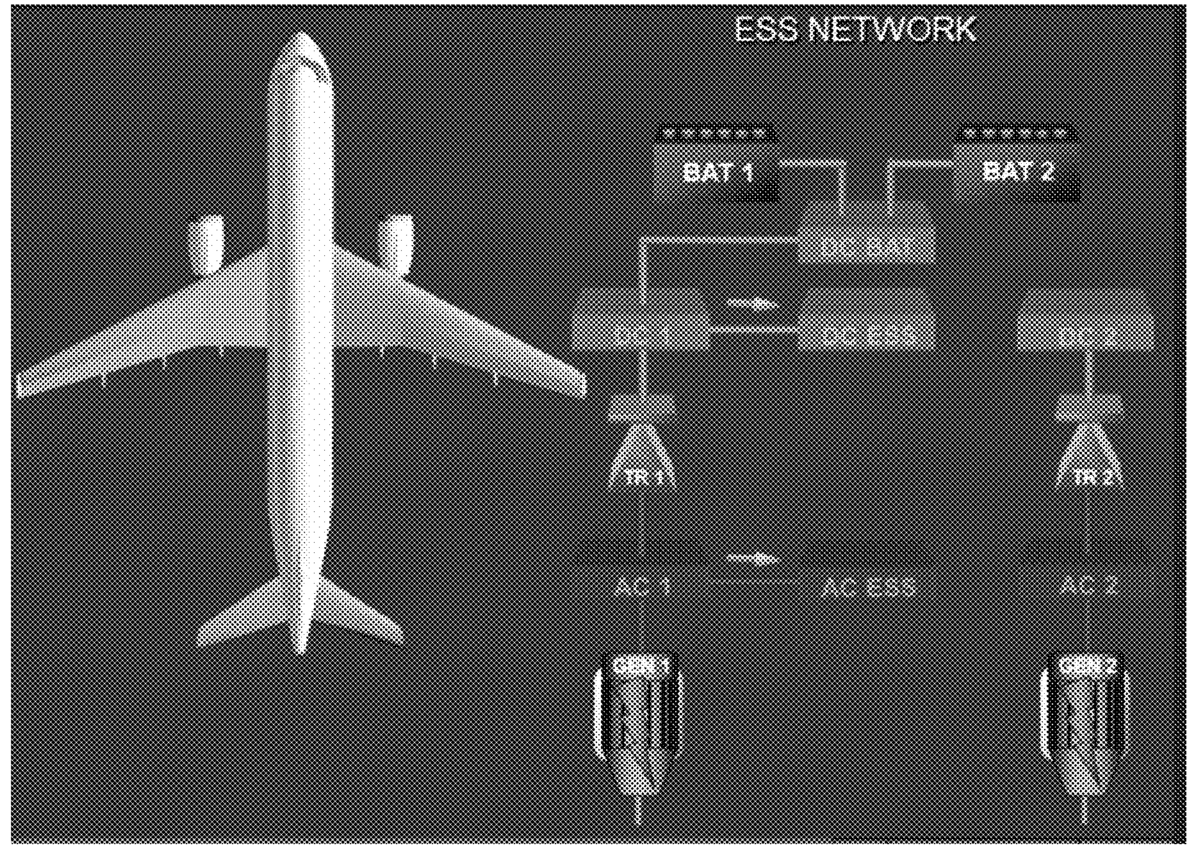
FIG. 4 is a conceptual block diagram showing a typical connection of an AC generator via a transformer rectifier to a DC power bus in an aircraft.
Figure 5:
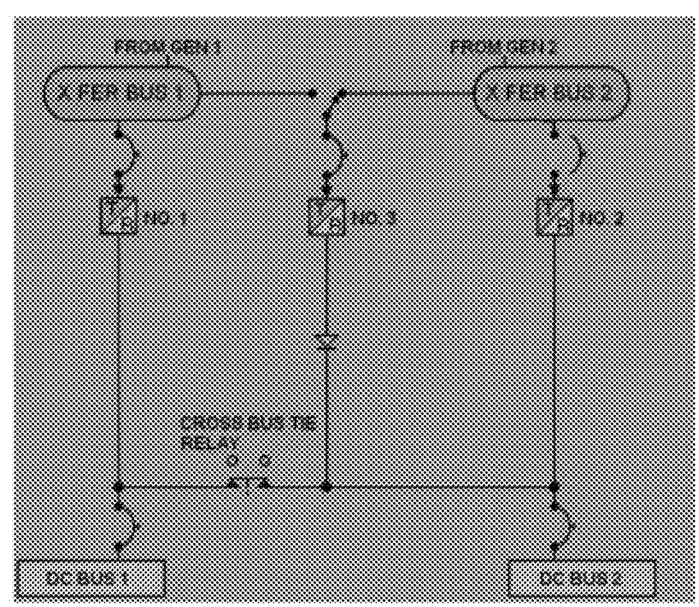
FIG. 5 is a schematic diagram showing a typical connection from an AC generator via a transformer rectifier to a DC power bus in an aircraft.

Referring now to FIG. 3, a DCPS 15 receives power from a Power Source that is an aircraft generator (see FIG. 4), or other aircraft power bus (see FIG. 5).

By way of background, as depicted in FIG. 4, commercial aircraft typically have two AC generators (GEN 1 and GEN 2) that produce 115V AC at either a fixed 400 Hz or a variable frequency output. On larger commercial aircraft with large electrical loads it may be advantageous to run 115V AC throughout the aircraft and to convert that AC voltage to DC voltage where needed. On smaller aircraft, such as business jets, there are advantages of converting the AC voltage to 28V DC at the generator using a Transformer Rectifier (TR) and running 28V through the cabin. This 28V DC bus is referred to as the "aircraft power bus" or the "aircraft DC power bus" (DC 1 and DC 2 in FIG. 4). All commercial aircraft have a DC power bus, and at a minimum that bus is used to charge batteries or power sections of the cockpit. The 28V bus is standard on today's aircraft, but there are development efforts underway by aircraft manufacturers to increase this to 48 VDC or even 270 VDC in an effort to offset the increased power needed on aircraft without adding to cable weight. This subject matter of this disclosure is applicable to future aircraft with higher voltage "aircraft DC power buses" as well. As used herein, the terms "aircraft power bus", "aircraft DC power bus", and "aircraft cabin DC power bus" are interchangeable.

On larger aircraft the cabin power bus carries high voltage AC to reduce the current and thus the cable size. As mentioned above, that high AC voltage is converted to low DC voltage where needed; and low voltage DC is needed to power lights, outlets, entertainment systems and other lower power equipment. The conversion of AC to DC voltage is performed by a "power converter". In the case of powering outlets, this "power converter" is often called an ISPS, a DCPS, or a DC power converter. The ISPS or DCPS are typically located in a box under a passenger seat. That box houses the power converter that converts 115V AC 400 Hz to 28 DC voltage. Newer DCPSs occupy less physical space than prior models and fit under passenger seats without impeding passenger leg room.

FIG. 5 shows in more detail the connection on a Boeing 737 from AC generators (GEN 1 and GEN 2) to DC power buses (DC BUS 1 and DC BUS 2). Interposed between the AC generators and DC power buses are via AC transfer buses (X FER BUS 1 and X FER BUS 2), which carry 115 VAC, and transformer rectifiers (TR 1 and TR 2), that step down the 115 V to 28 V and convert AC to DC. FIG. 5 shows an example in which a third transformer rectifier, TR No. 3, is provided as a backup to TR No. 2.

Turning again to the embodiment of FIG. 3, the DCPS 15 converts and conditions the power to provide 28 VDC to up to six clusters of up to six seat nodes per cluster via a Local Interconnect Network (LIN) bus 20. As shown in the figure, each seat node is provided with three combo USB Type-C/A outlets 30, an In Use Light (IUL) 40, and an auxiliary load ("Aux Load") 50, such as a seat actuator, a wireless transmitter/receiver, a light, a sensor, or other electronic device. An intermediate device, a smart PDC 60, disposed between the DCPS 15 and each seat node, distributes power among multiple power outlets 30, the IUL 40 and the Aux Load 50. The connection from the DCPS 15 to each PDC 60 includes power and communication. Other embodiments are contemplated having greater or fewer numbers of clusters, nodes, and USB outlets. The total number of clusters and nodes that may be connected to the DCPS is limited only by the power capability of the DCPS and any limit (either in nodes or distance) imposed by the communication bus.

Power is transmitted from the DCPS 15 to the PDC 60, and the PDC 60 distributes power and communication to each data-capable load and provides IUL status if required. In one embodiment, each PDC 60 is capable of powering up to three 60 W USB OU units 30, one 84 W, 28V auxiliary load 50, and one IUL 40. A microcontroller 65 in the PDC 60 oversees the functioning of the power supply system and communicates with various components via a communication bus 20. See FIGS. 6 and 7. Preferably, the microcontroller 65 also monitors power usage, power demand, power delivery, system status, system health, and generates signals that are sent as needed to either the outlets 30, system loads, or to the DCPS 15 for communication to the aircraft information systems.

Figure 6:
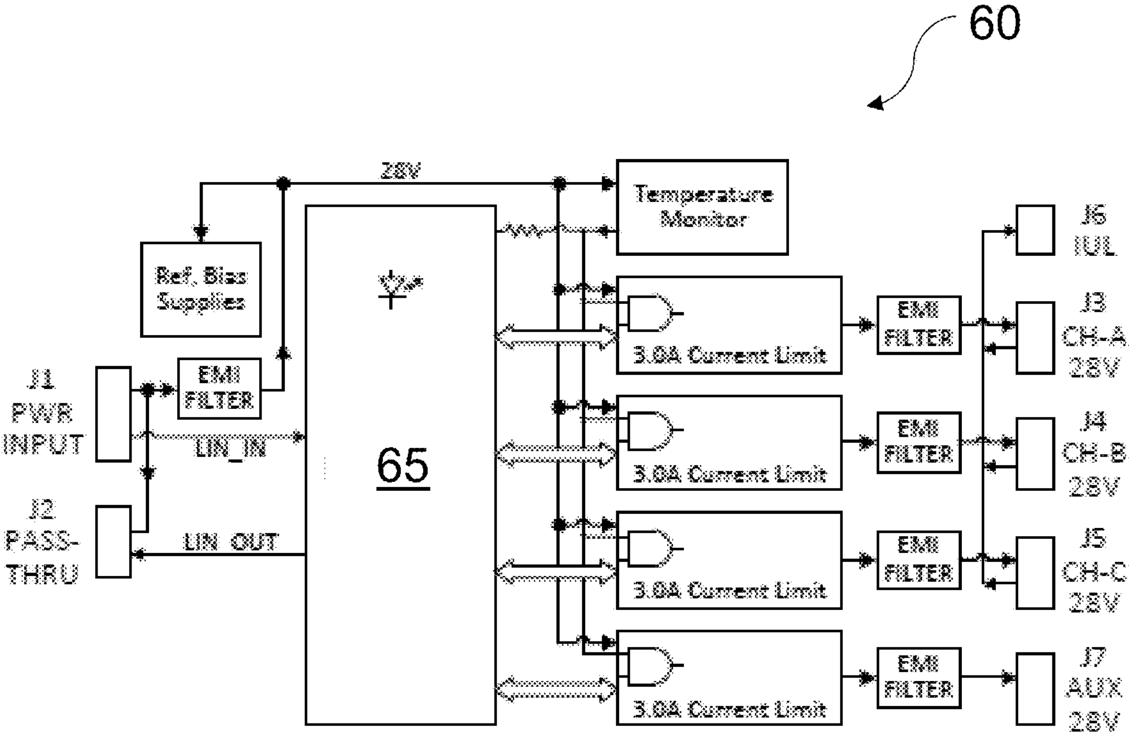
FIG. 6 is a schematic block diagram of an embodiment of a PDC.

FIG. 6 shows an embodiment of the PDC 60 that incorporates the microcontroller 65. In this embodiment, the PDC 60 is configured for connection to one IUL 40, three OUs 30, and one AUX load 50. The microcontroller 65 has a memory and runs software that may be configured by a user, such as to assign a maximum power limit or power priority level to one or more OUs 30.

Figure 7:
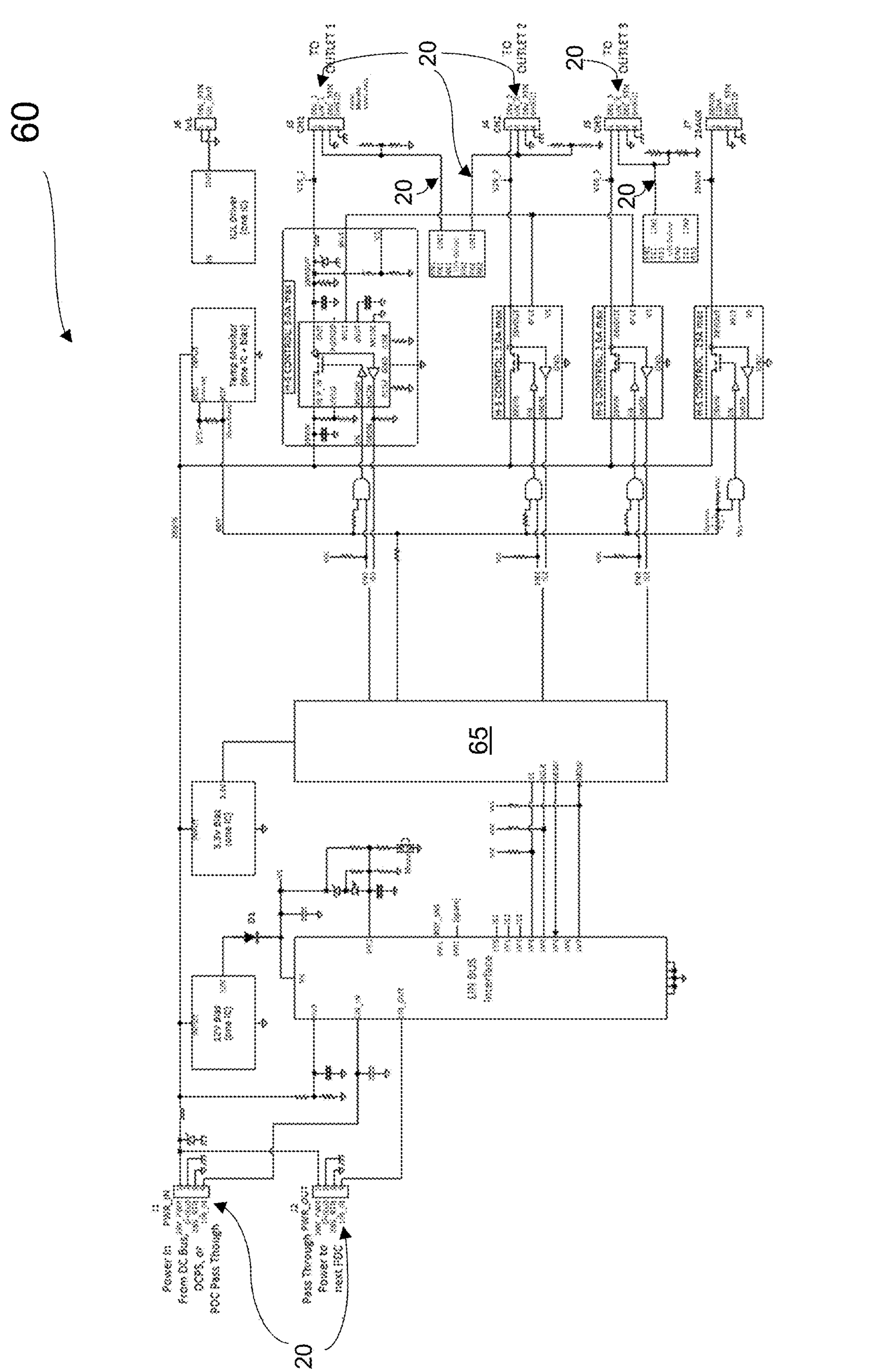
FIG. 7 is a circuit schematic diagram of an embodiment of a PDC connected to a LIN bus.

FIG. 7 is a circuit diagram of an embodiment of the PDC 60 that shows the communication links to each output channel. In this embodiment, the PDC 60 is configured to interface with a communication bus, and more specifically a LIN bus 20.

The PDC 60 is connected to and optionally communicates via bus 20 with some or all loads and additionally to a power converter, which is the DCPS 15 in this embodiment. The communication connection 20 (shown as a LIN bus in the embodiments of FIGS. 3 and 7) provides the ability to manage outlets and other smart devices and communicate information related thereto. PDC power management functions may include reporting system status, or implementing instructions sent from the power converter or from an aircraft level power command. Each OU 30 communicates its status back to the PDC 60 via the bus 20. As defined in the type-C USB standard, there is the capability to also send information of the device attached to the Type-C outlet. The communication bus 20 also has error checking capability to ensure that the data is not corrupt.

Each PDC 60 is preset with a maximum power limit and when the PDC total output power reaches or even exceeds that maximum limit, the PDC's microcontroller 65 will communicate to the smart outlets 30, instructing the smart outlets 30 to limit, i.e., reduce or shut off, their power supply capability and to renegotiate new power contracts if necessary. A "power contract" is a term used in the USB standard specification for describing the function of USB Power Delivery (PD). The term is specific to USB type-C outlets and devices, and simply refers to negotiated voltage and current between a power source and a power sink. In USB PD, the power source sends to the device a list of capabilities (voltage and current) and the device responds with a selected capability it would like to use along with the maximum current it intends to draw. The power source reviews and sends the device an OK. The agreed to capabilities is called a "power contract".

In one embodiment, the PDC 60 may be configured with a "First In Last Out" default priority setting for power distribution, with the exception of the AUX load 50 being assigned highest priority. Software running on the microcontroller 65 in the PDC 60 can be modified according to the needs of a particular aircraft, such as to assign a window seat lowest priority and limit the power supplied to that window seat first. Other embodiments contemplate the setting of a higher power limit for a frequent flyer or a passenger who pays an additional fee for higher power.

Based on aircraft power system requirements, the aforementioned maximum power limit may be set, controlled, changed, or overridden externally via a communication link to the power supply, by a command from the power converter, by an aircraft level power command (via an aircraft DC system power bus, or by another control input such as from a pay-for-power system. This capability to determine and change which loads are to be power-limited, and to assign priority to certain loads, is one of the advantages of the PDC system.

Regarding the structure of the communication bus 20 connecting the microcontroller with various components, it should be understood that any communication bus structure that allows for sufficient reaction to loading conditions may be employed. Without limitation, such bus structures may employ LIN, CAN bus, Ethernet, RS-485 or other forms of communication, including serial communication. Various types of information may be exchanged over the communication bus 20. For instance, components can indicate their power or voltage requirements, fault status, or current operation conditions.

In one embodiment, USB Type-C/A outlets 30 are smart outlets that are consumer electrical outlets for supplying power to users in the aircraft's passenger cabin, for instance, for use with Portable Electronic Devices (PEDs) such as laptops and cell phones.

Other embodiments may employ different architectures with respect to these components. For example, in an alternative embodiment, the PDC 60 could receive power directly through a connection to a DC aircraft generator.

In yet other alternative embodiments, the PDC may be used to control outlets for such reasons as shutting them off during take-off and landing or as a method to limit power on a pay for power system.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention. For instance, although the described embodiments relate to aircraft and particular load types, it should be understood that various embodiments in other environmental settings and with other numbers and types of loads are within the scope of the present disclosure.

What is claimed is:

1. A power supply system comprising:

a power distribution connector (PDC) configured to receive DC power as input from a DC power supply via a communication bus and configured to deliver DC power to at least one DC outlet connected to the power distribution connector by way of the communication bus which in turn is capable of supplying the delivered DC power to a DC load, the DC outlet being connected directly to the communication bus; and the communication bus configured to connect the PDC, the at least one DC outlet and the DC power supply, to allow the PDC to communicate data to the power supply and the DC outlet to communicate data to the PDC.

2. The power supply system of claim 1, wherein the PDC is configured to be set with a maximum power limit that may be modified by the power supply via the communication bus, by an aircraft level power command via an aircraft system power bus, or by another control input or from a pay-for-power system.

3. The power supply system of claim 2, wherein the PDC comprises a microcontroller configured to communicate with the at least one outlet, to control said outlet to reduce its consumption of power, and to renegotiate a new power contract when power consumption by the at least one DC load reaches or exceeds the maximum power limit.

4. The power supply system of claim 2, wherein the PDC is additionally configured to deliver DC power to a low-power DC load in a seat group on an airplane, the low-power DC load drawing 100 W of power or less and selected from the group consisting of a seat actuator, a reading light, an inflight entertainment system, a wireless transmitter/receiver, a sensor, and a device that draws power via a USB outlet.

5. The power supply system of claim 4, wherein the DC power supply is capable of receiving power from a power bus on an aircraft.

6. The power supply system of claim 4, wherein the PDC is capable of receiving power from an aircraft generator.

7. A method of power management, comprising the steps of:

providing a DC power supply;

providing a power distribution connector (PDC) interposed between the DC power supply and at least one DC outlet operable to connect to a DC load;

interconnecting the DC power supply, the PDC, and the DC outlet by way of a communication bus to deliver power from the DC power supply to the PDC and to allow the PDC to communicate data to the DC power supply and the DC outlet being connected directly to the communication bus and capable to communicate data to the PDC;

presetting the power distribution connector with a maximum power limit for the outlet; and the power distribution connector instructing the at least one DC outlet to limit its power supply capability and to renegotiate new power contracts when the power consumption by the at least one DC load reaches or exceeds said maximum power limit.

8. The method of claim 7, further comprising the step of modifying the maximum power limit via the communication bus, by an aircraft level power command via an aircraft system power bus, or by another control input, including a pay-for-power system.

9. The power supply system of claim 1, further comprising a plurality of outlets, wherein the power distribution connector is capable of establishing a priority for one or more of the plurality of outlets.

10. The method of claim 7, wherein the power distribution connector is connected to a plurality of outlets, wherein the power distribution connector is capable of establishing a priority for one or more of the plurality of outlets.

* * * * *